United States Patent [19]

Tanner

[11] 3,961,104

[45] June 1, 1976

[54] INTERNAL CYLINDRICAL BEARING SURFACES

[76] Inventor: John Ernest Tanner, Dixon St., Wolverhampton, WV2 2BU Staffordshire, England

[22] Filed: June 11, 1973

[21] Appl. No.: 368,874

[30] Foreign Application Priority Data

Oct. 25, 1972 United Kingdom............ 49150/72

[52] U.S. Cl..................... 427/198; 29/156.4 WL; 51/290; 51/295; 51/318; 51/291; 51/307; 308/239; 308/241; 308/240; 427/199; 427/204; 427/259; 427/201; 427/264

[51] Int. Cl.²............................................ B44C 1/08

[58] Field of Search............... 117/9, 24, 19, 25, 20, 117/64 R, 95, 135.1, 100 M, 169 A, 102 A, 66, 105.3, 94, 50, DIG. 1; 29/149.5 C, 149.5 NM, 156.4 WL; 51/295, 309, 291, 281 R, 290, 307, 318; 106/44; 252/12, 12.2; 308/241, 239, 240; 83/1, 6, 7, 10, 11, 12; 427/198, 199, 201, 204, 264, 271, 289

[56] References Cited
UNITED STATES PATENTS

| | | | |
|---|---|---|---|
| 1,097,565 | 5/1914 | Straubel | 51/307 |
| 2,558,286 | 6/1951 | Albertson | 117/64 R |
| 2,577,818 | 12/1951 | Shaw | 51/290 |
| 3,171,189 | 3/1965 | Hedgecock | 29/156.4 WL |
| 3,274,019 | 9/1966 | La Vine | 117/95 |
| 3,368,263 | 2/1968 | Harris, Jr. | 51/309 |
| 3,513,017 | 5/1970 | Waters et al. | 117/94 |
| 3,520,667 | 7/1970 | Taylor | 51/295 |

*Primary Examiner*—Douglas J. Drummond
*Assistant Examiner*—J. J. Gallagher
*Attorney, Agent, or Firm*—Emory L. Groff, Jr.

[57] ABSTRACT

A method of producing a hard wearing bearing surface on a component such as a cylinder or cylinder liner, by pressing an accurately screened hard powder in liquid medium into engagement with the surface and on a helical path, the pressure and powder size being such that oil retaining micro-grooves are formed and also that a great number of powder particles, which particles virtually constitute the bearing surface, are embedded.

18 Claims, 5 Drawing Figures

INTERNAL CYLINDRICAL BEARING SURFACES

BACKGROUND OF THE INVENTION

This invention relates to swept bearing surfaces, and is primarily but not exclusively concerned with components such as cylinders and cylinder liners for engines such as internal combustion engines for pumps and other machines. The invention can also be applied to parts with external bearing surfaces such as pistons, and to swept surfaces such as rotary piston engines with epitrochoid housings. An object of the invention is to produce bearing surfaces particularly but not exclusively of components of mild steel or cast or malleable iron, which are extremely hard wearing.

A further object of the invention is to produce bearing surfaces on components in which the material of the component itself virtually does not constitute the bearing surface. Thus materials which normally cannot be used e.g. for cylinder or cylinder liners such as malleable or soft iron, can be rendered with hard wearing surfaces.

SUMMARY OF THE INVENTION

According to the invention there is provided a method of producing a cylindrical or other swept bearing surface on a component, which method consists in utilising a slurry or paste of abrasive or hard powder or grit screened accurately to maximum size, and in pressing the said slurry into engagement with said surface on a helical path from one end of said surface to the other repetitionally with a pressure such that grooves on criss-cross helical paths are cut in the surface and particles of the powder or grit embedded in the surface.

Thus in carrying out the process, a number of microgrooves are cut into the surface on opposite hands by the particles and the particles will be embedded or welded in the surface. The grooves provide oil retention grooves and the particles a hard wearing bearing surface. It will be understood that the grooves are of very small dimensions and their spacing close, the depth and spacing depending on the particle size and speed of rotation and reciprocation of the tool relative to the workpiece. For example, the particle size and speed can be such that grooves in the region of 0.001 – 0.003 mm in depth width and spacing are formed. The grooves will not be in general, continuous but may extend only a short distance along the surface. It will be seen that a very large number of particles are embedded to form the bearing surface. It is possible, first to produce substantially continuous grooves with substantially no particle embedment and then follow up by using greater pressure, to cause particles to be embedded in the formed grooves. Pressure to cause embedment is in the region of 10 – 20 p.s.i. or more.

It has been found that in use, embedded particles remain in the surface and are not dislodged during operation of the engine or other machine. The grooves also serve for oil retention.

It has been found that by subjecting the surface to a second operation with a powder grit of smaller size, there is produced a low friction smooth finish and a hard wearing surface with a great number of particles embedded. This second run effectively smooths off the sharp peaks between the grooves without disturbing to any appreciable extent, the grooves cut by the first run, and it can result in the embedding of further particles in grooves on a helical path. It also will force in any particles further into the surface which project excessively and clean off sharp peaks on particles. Further, if any particles are loosely embedded they will either be forced in or removed.

The particles virtually form the bearing surface and provide a large proportion of such surface area e.g. 50%.

Various proposals have been made in the past for grooving bearing surfaces such as those of cylinders or liners to ensure their oil retaining properties. Such known proposals include etching, sand blasting, and also producing helical grooves utilising a slurry of a hard powder or grit. However in all previous proposals, the operation was such that oil retaining pockets or grooves were formed, and it was essential to ensure that any substance used for pocketing or grooving be removed from the component so that the component itself remained completely unadulterated.

BRIEF DESCRIPTION OF THE DRAWINGS

The accompanying diagrammatic drawings illustrate a cylinder liner produced according to the invention and a means for treating a piston surface. In the drawings.

DESCRIPTION OF PREFERRED EMBODIMENTS

Figure 1:
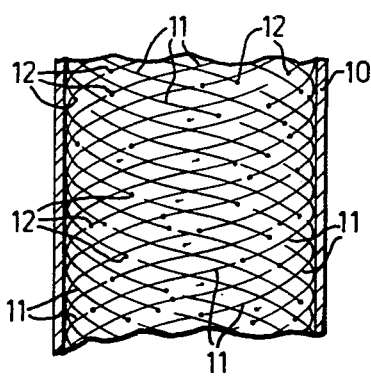
FIG. 1 is a longitudinal section of part of the liner.
Figure 2:
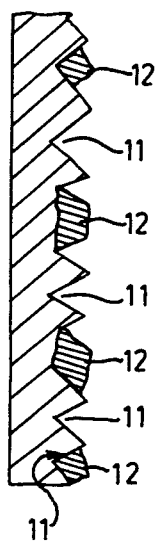
FIG. 2 a fragmentary section through the cylinder wall, after particle embedment, FIG. 3 a view similar to FIG. 2 after the finishing operation.
Figure 3:
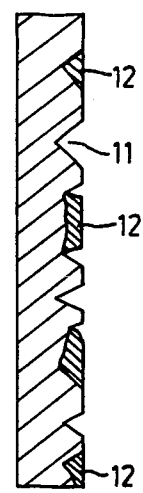

Referring firstly to FIGS. 1 – 3, it will in the first place, be understood that these views are purely diagrammatic, bearing in mind that in practice the grooves are close-spaced and of a depth and width of between 0.001 and 0.003 mm and the particles can constitute a large proportion of the final surface area. In FIG. 1, the cylinder 10 will be set up with a conventional lapping tool with spring-loaded lapping sticks and arranged so that the tool is rotated and reciprocated relative to the cylinder axis and within the cylinder, whilst a slurry of silicon carbide in liquid medium is poured in at the top of the cylinder and collected at the bottom and recycled. The grit is of a screen size of in the region of 220 and should be as free from sharp peaks as possible. The action results in the grit particles cutting grooves 11 on helical paths and on opposite hands to produce a diamond pattern. An initial run with a light pressure e.g. 10 p.s.i. or less may be done to start grooving without substantial particle embedment, and subsequently the pressure increased so that particles increase the groove depths and widths and finally become embedded or welded in as at 12. Generally a particle is embedded at the end of a noncontinuous groove and a following particle will then commence to cut a following groove. The initial pressure can be great enough to result in embedment without prior grooving, i.e. the one operation both grooves and embeds the particles, it being understood that the pressure used and length of time the process continues will be dependent mainly on the material of the cylinder.

The operation results in the production of a great number of helical grooves and the embedment of a great number of particles. The grooves may be continuous or some may extend only around a part of the surface, the length of time the operation is carried out and the pressure being the controlling factors.

The method according to the invention is not intended to size the cylinder bore or other component as there is no appreciable stock or surface removal, the powder or grit grooving the surface. Thus, the method can be applied to engine cylinder blocks, or wet and dry type cylinder liners of metal or cylinders of ceramic or like material.

A fragmentary section of the cylinder after the above operation is shown diagrammatically in FIG. 2. As will be seen, particles 12 are shown embedded in grooves 11, some of which particles may project slightly from the general surface. In many applications surfaces so treated are acceptable, but preferably the surface is subjected to a second similar operation but using a grit of smaller size (screen size 400–500). This second operation has the effect of smoothing off the peaks of the cylinder surface between grooves, removing sharp edges of particles and also tends to force particles if upstanding further into the surface. Moreover, it is found that should any particles be loosely embedded by the first operation, the second operation will either force them into the surface or remove them. FIG. 3 shows a finished surface part which is substantially flat, is grooved and has a multiplicity of close-spaced hard wearing particles therein.

Figure 4:
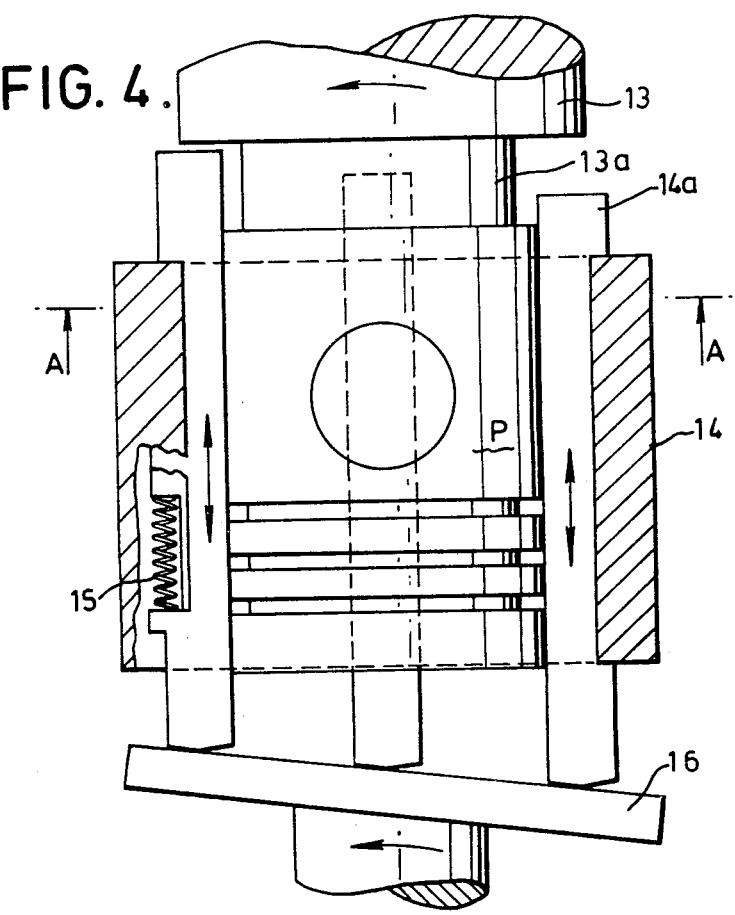
FIG. 4 shows in side view a lapping tool for treating a piston and FIG. 5 is a sectional plan of FIG. 4.
Figure 5:
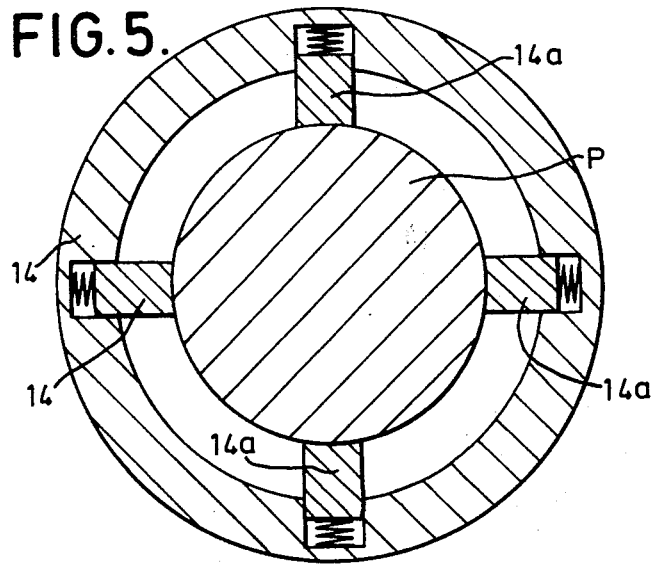

As previously mentioned the invention can be applied to external bearing surfaces such as those of pistons. As shown in FIGS. 4 and 5, a piston P is mounted on a rotary member 13 by a locating plate 13a to rotate with the member 13. The piston is concentrically within a stationary holder 14, which carries a plurality of lapping sticks 14a spring loaded to the piston surface. The sticks also can move longitudinally axially with respect to the holder and are spring loaded downwardly by springs 15, so that they are reciprocated by a swash plate 16 and the springs.

The slurry is poured in between the holder and piston and is re-cycled and the rotary reciprocating motion produces the criss-cross grooving and particle embedment.

It will be understood that an arrangement of lapping sticks will be used to treat internal cylindrical surfaces as shown in FIG. 1. In this case, the blades extend radially outwardly from a holder. Preferably the cylinder is stationary and the holder both rotates and reciprocates.

It is also possible to press the particles into the surface using a spring loaded roller or rollers to force in the particles by a rotary action or rotary and reciprocating action relative to the surface under treatment. Further, a lapping tool with flexible or rigid lapping sticks with a negative or positive leading edge rake angle can be used. In the case of a roller or rollers, the leading edge or sides may be chamfered or radiussed to provide a gradual increasing force or load to the particles.

The grit or particles can be poured in a liquid medium or the surface can be pre-coated with particles applied in a suspension or as a paste.

An important feature of the invention is that components of mild steel or of malleable or soft iron of low quality can be treated so as to produce components with satisfactory hard wearing bearing surfaces as it is the embedded particles which constitute the bearing surface of a component. In the case of soft iron, particles may become embedded in soft pockets without prior grooving.

I claim:

1. A method of producing a hard wearing swept bearing surface on a machine part that is to run in contact with another machine part without wear, which method consists in utilising a slurry of hard grit screened accurately and in pressing the said slurry into engagement with said surface on a helical path from one end of said surface to the other repetitionally with a pressure such that grooves on criss-cross helical paths are cut out in the surface and particles of the grit are deliberately embedded in the surface.

2. A method as claimed in claim 1, which consists in pressing said slurry into engagement by a spring pressed lapping tool.

3. A method as claimed in claim 1, in which the grooves are non-continuous, and at the end of the groove-cutting at least some grooves each have a particle embedded at least at its end.

4. A method as claimed in claim 1, in which the grooves are continuous.

5. A method as claimed in claim 1, wherein the grooved and embedded surface is finished by a second similar operation using particles of grit of smaller size.

6. A process of treating a bearing surface of a first metal machine part that is to run in contact with a second machine part without wear, wherein the surface of said first machine part is deliberately impregnated with particles of hard grit forced into the surface so as to become permanently embedded therein.

7. A process according to claim 6, wherein the hard particles are embedded by mechanically impacting them into the metal.

8. A process according to claim 6, wherein the hard particles are worked into the surface by flowing a suspension of graded particles in a liquid over the surface, and applying pressure by means of a resiliently loaded tool that is moved in a repetitive cycle of motion over the surface.

9. A process according to claim 8, wherein two treatments of the surface are carried out in sequence, the second with hard particles graded to a smaller grain size than the first.

10. A process according to claim 8, wherein the tool is moved over the surface in a repetitive helical motion such as to produce criss-cross grooves in the surface.

11. A process according to claim 8, wherein the hard grit is silicon carbide and the liquid in which it is suspended is lapping oil.

12. A process according to claim 8, wherein the tool used is a lapping tool with spring-loaded blades.

13. A process according to claim 9, wherein the second treatment is carried out at a higher pressure than the first, such that the surface is grooved in the first treatment and has particles embedded in it in the second treatment.

14. A process of treating a cylindrical bore surface of a first metal machine part in which bore a second machine part is to slide contiguously with said bore surface without wear, comprising mounting said first part with the bore axis vertical and operating on the surface with a lapping tool having resiliently loaded lapping blades that are both rotated about and reciprocated along said axis relatively to said bore while slurry of hard graded grit particles in a lapping fluid is simultaneously poured in at the top of the bore to flow over said surface, the grain size of the grit particles and the pressure of the tool blades being deliberately chosen to embed grit particles permanently in said surface.

15. A process according to claim 14, carried out in two stages of operation, the load pressure being higher and the grain size smaller in the second stage than in the first.

16. A process according to claim 15, wherein the screen sizes of the grit grains are in the region of 220 and in the range 400–500 in the two stages, respectively.

17. A process according to claim 15, wherein the tool pressures in the two stages are in the region of not more than 10 p.s.i. and 16 p.s.i., respectively.

18. A process according to claim 15, wherein the tool is rotated at approximately 170 r.p.m. and reciprocated at about five cycles per minute.

* * * * *